(12) United States Patent
Rydenhag et al.

(10) Patent No.: US 8,902,184 B2
(45) Date of Patent: Dec. 2, 2014

(54) ELECTRONIC DEVICE AND METHOD OF CONTROLLING A DISPLAY

(75) Inventors: Daniel Tobias Rydenhag, Gothenburg (SE); Robert Simon Lessing, Malmö (SE); Donald James Lindsay, Mountain View, CA (US); Devin Jay Kaiser, Kitchener (CA)

(73) Assignee: BlackBerry Limited, Waterloo, Ontario ( * ) Notice: Subject to any disclaimer, the term of this patent is extended or adjusted under 35 U.S.C. 154(b) by 0 days.

(21) Appl. No.: 13/563,444

(22) Filed: Jul. 31, 2012

(65) Prior Publication Data

US 2013/0227478 A1    Aug. 29, 2013

Related U.S. Application Data

(63) Continuation of application No. 13/404,651, filed on Feb. 24, 2012.

(51) Int. Cl.
| | |
|---|---|
| *G06F 3/041* | (2006.01) |
| *G09G 5/02* | (2006.01) |
| *G06F 3/048* | (2013.01) |
| *G06F 3/033* | (2013.01) |

(52) U.S. Cl.
USPC ............ 345/173; 715/810; 715/863; 345/593

(58) Field of Classification Search
USPC ....................................................... 345/173
See application file for complete search history.

(56) References Cited

U.S. PATENT DOCUMENTS

| | | | |
|---|---|---|---|
| 2004/0068543 | A1 | 4/2004 | Seifert |
| 2009/0064055 | A1 | 3/2009 | Chaudhri et al. |
| 2009/0094562 | A1* | 4/2009 | Jeong et al. ................... 715/863 |
| 2011/0047368 | A1 | 2/2011 | Sundaramurthy et al. |
| 2011/0163976 | A1* | 7/2011 | Barnhoefer et al. .......... 345/173 |
| 2011/0175748 | A1* | 7/2011 | Small et al. ............. 340/815.55 |
| 2012/0105358 | A1* | 5/2012 | Momeyer et al. ............. 345/174 |
| 2012/0233571 | A1 | 9/2012 | Wever et al. |
| 2012/0299847 | A1* | 11/2012 | Kwon et al. ................... 345/173 |
| 2013/0227495 | A1 | 8/2013 | Rydenhag et al. |

OTHER PUBLICATIONS

European Patent Office, The Extended European Search Report issued in European Patent Application No. 12194498.7, dated Mar. 22, 2013, 6 pages.
The United States Patent and Trademark Office, Office action issued in U.S. Appl. No. 13/404,651 dated Jan. 31, 2013, 24 pages.
International Searching Authority, International Search Report and Written Opinion issued in International Application No. PCT/US2012/026620, mailed Mar. 22, 2013, 11 pages.
The United States Patent and Trademark Office, Office action issued in U.S. Appl. No. 13/404,651, dated Aug. 27, 2013, 40 pages.
United States Patent and Trademark Office, "Advisory action," issued in connection with U.S. Appl. No. 13/404,651, dated Nov. 27, 2013, 7 pages.

(Continued)

*Primary Examiner* — Charles V Hicks
(74) *Attorney, Agent, or Firm* — Hanley, Flight & Zimmerman, LLC.

(57) ABSTRACT

A method comprises detecting, by a portable electronic device having a display, a gesture, selecting a category of selectable items based on the gesture. The method further comprises identifying one or more selectable items within the selected category to be displayed, and displaying the one or more selectable items.

38 Claims, 8 Drawing Sheets

(56) References Cited

OTHER PUBLICATIONS

United States Patent and Trademark Office, "Non-final Office action," issued in connection with U.S. Appl. No. 13/404,651, dated Apr. 9, 2013, 38 pages.

European Patent Office, "Communication pursuant to Article 94(3) EPC," issued in connection with European Application No. 12194498.7, dated Jun. 27, 2014, 7 pages.

Canadian Intellectual Property Office, "Examiner's Report," issued in connection with Canadian Application No. 2,806,835, dated Apr. 29, 2014, 2 pages.

International Bureau, "International Preliminary Report on Patentability," issued in connection with International Application No. PCT/US2012/026620, on Aug. 26, 2014, 7 pages.

The United States Patent and Trademark Office, "Notice of Allowance," issued in connection with U.S. Appl. No. 13/404,651, dated Jul. 24, 2014, 28 pages.

* cited by examiner

ELECTRONIC DEVICE AND METHOD OF CONTROLLING A DISPLAY

FIELD OF TECHNOLOGY

This application claims the benefit of U.S. patent application Ser. No. 13/404,651, filed Feb. 24, 2012, the entire content of which is incorporated herein by reference.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

BRIEF DESCRIPTION OF THE DRAWINGS

FIG. 3 through FIG. 17 illustrate examples of displaying categories of selectable items on a portable electronic device in accordance with the disclosure.

FIG. 19 through FIG. 23 illustrate examples of progressively displaying information from a low-power condition on a portable electronic device in accordance with the disclosure.

DETAILED DESCRIPTION

The following describes an apparatus for and method of controlling a display. A gesture is detected, and based on the gesture a category of selectable items is selected. Selectable items are identified and displayed based on the selected category.

Displaying selectable items (for example, notifications, communications, application icons and widgets, and so forth) based on a detected gesture permits a user to preview information regarding the selected category of selectable items, and may also provide access to those items directly without having to open or navigate to associated applications. Each category may be associated with a different display area, such that depending on the gesture, the user can "peek" at selectable items of a particular category quickly and easily. The described process may be reversed, for example, by reversing the direction of the gesture or by releasing contact with the touch-sensitive display.

A gesture includes a static or moving touch detected by a touch-sensitive display, a 3-dimensional (3D) spatial movement detected by spatial sensors, a touch or 3D spatial movement detected by an optical sensor, an audible input, including a voice command, detected by a speech or audible recognition device, depression of a physical key or button, and so forth. Other types of gestures may be successfully utilized.

Although many examples described herein refer to a gesture detected by a touch-sensitive display, other methods of gesture detection may be utilized. For example, a gesture may be a generalized trajectory description characterized as a sequence of 3D points in time, and as such many different sensors may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known. A gesture may be composite and consist of different actions which are detected by a combination of the techniques described above. For example, movement of the device may be used to "wake up" the device from a low power condition, and a touch contact may be employed to determine which category of selectable items to display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

Figure 1:
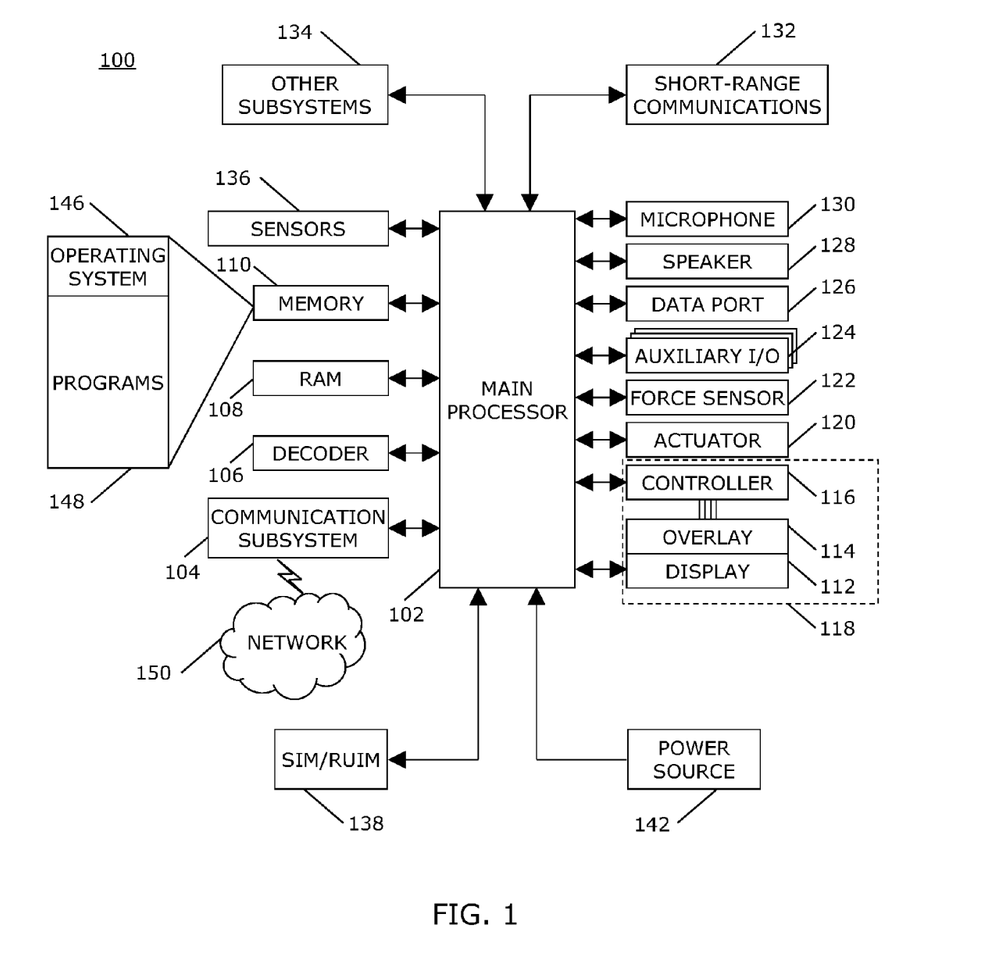
FIG. 1 is a block diagram of an electronic device such as a portable electronic device in accordance with the disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 optionally including a touch-sensitive overlay 114 operably coupled to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Input via a graphical user interface is provided via the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The display 112 may be any suitable type of display, including a liquid crystal display (LCD), an organic light-emitting diode (OLED) display, and so forth. The processor 102 may interact with one or more spatial sensors 136, including accelerometers or gyroscopes that may be utilized to detect direction of gravitational forces or gravity-induced reaction forces, proximity sensors, optical sensors, and so forth.

To identify a subscriber for network access; the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may comprise any suitable material, such as indium tin oxide (ITO).

One or more touches, also known as touch contacts, touch events or gestures, may be detected by the touch-sensitive display 118. The processor 102 may determine attributes of the touch, including for example location(s) of the touch and the duration of the touch contact. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable input member, such as a finger, thumb, appendage, or other objects, for example, a stylus, pen, or other pointer, depending on the nature of the touch-sensitive display 118. Multiple simultaneous touches may be detected. The touch, touch contact or gesture (hereinafter referred to simply as a "gesture") may be a simple touch or a touch that moves. The gesture may be simple or complex. For example, the gesture may be a swipe that moves in a single direction along the display or a touch that hovers or is maintained at or near the same location. Such a gesture is detected as a touch contact at a plurality of locations on the touch-sensitive display 118. In addition to location and duration attributes, it is also possible to determine a direction of a gesture. The gesture may begin anywhere on the touch-sensitive display 118, although advantage may be gained, for example, by detecting a touch starting at any edge of the display, such as the bottom of the display or a corner of the display. The gesture may be a series or sequence of taps on the touch-sensitive display 118. The location of the taps may or may not be relevant to detecting the gesture. The gesture may begin as a tap and progress to a swipe, having a discernable direction. The gesture may be composed of a swipe having multiple sections, and each section having a discernable direction.

An accelerometer or gyroscope 136 may be utilized to detect 3D spatial gestures. A sequence of acceleration values may be detected in the different spatial dimensions as a function of time and constitute trajectory information that can be recognized as a gesture. For example, a quick flick or tilt of the portable electronic device 100 are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device 100. Scanning of any of these sensors or devices may take place every 100 to 500 ms during low-power condition or at any other suitable time period.

The actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
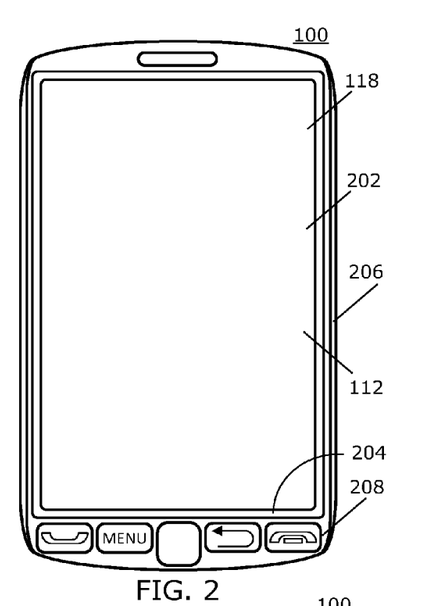
FIG. 2 is a front view of a portable electronic device in accordance with the disclosure.

A front view of a portable electronic device is shown in FIG. 2. The touch-sensitive display 118 includes a display area 202 in which information may be displayed, and a non-display area 204 extending around the periphery of the display area. The display area 202 generally corresponds to the area of the display 112. Information is not displayed in the non-display area 204 by the display 112, which non-display area 204 is utilized to accommodate, for example, electronic traces or electrical connections, adhesives or other sealants, and/or protective coatings around the edges of the display area. The non-display area 204 may be referred to as an inactive area. The non-display area 204 is typically not part of the physical housing or frame 206 of the electronic device. Typically, no pixels of the display 112 are in the non-display area 204, thus no image can be displayed by the display 112 in the non-display area 204. Optionally, a secondary display, not part of the primary display 112, may be disposed under the non-display area 204.

Touch sensors may be disposed in the non-display area 204, which touch sensors may be extended from the touch sensors in the display area or distinct or separate touch sensors from the touch sensors in the display area 202. A touch, including a gesture, may be associated with the display area 202, the non-display area 204, or both areas. The touch sensors may extend across substantially the entire non-display area 204 or may be disposed in only part of the non-display area 204. Touches may be detected, for example, starting in the non-display area 204 and continuing into the display area 202 or starting in the display area 202 and continuing into the non-display area 204, whether or not touch sensors are disposed in the non-display area 204. The portable electronic device 100 optionally includes a set of convenience keys or buttons 208 that may be separate physical keys or buttons or virtual keys or buttons. When the electronic device 100 is in a low-power condition, which may be referred to as a "sleep" condition or state, no information is displayed on the touch-sensitive display. During a low-power condition, processes with the electronic device 100 are discontinued or operated at a slower speed and one or more hardware components may be powered-down or operated at a slower speed to conserve power or provide other advantages.

Examples of identifying selectable items for display based on a detected gesture are described with reference to FIGS. 3 to 18. In some examples, the gesture is detected when the electronic device 100 is initially in a low-power condition or in a locked condition. Identifying and displaying selectable items in this manor permits a user to preview information about a category of such selectable items. This may be referred to as a "peek view".

Figure 3:
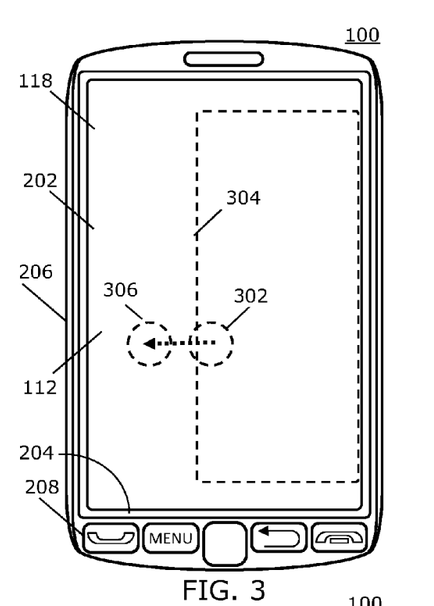

In the portrait orientation example of FIG. 3, a gesture is initially detected, at a start location 302, which may be anywhere within the display area 202 of the touch-sensitive display 118 and continues to be detected along the path of the arrow. In some examples, the gesture may start from the non-display area 204 and continue to be detected along a path to a location within the display area 202. The gesture is detected and a category of selectable items is selected based on the gesture. Detecting the gesture includes, for example, detecting a direction of movement of the gesture.

In an example, shown in FIG. 3, the gesture is a swipe, slide or drag action toward the left hand side of the display 112. The direction of movement of the gesture is relative to the start location 302 of the gesture. In response to the gesture, selectable items are identified for display and are displayed in a pre-defined area of the display.

In some examples, the selectable items are displayed in different pre-defined areas of the display depending on the selected category. In relation to the example gesture of FIG. 3, a swipe from right to left causes selectable items (not shown in FIG. 3) of the selected category to be displayed in a right-hand side display area 304 of the display.

In a further example, the gesture may comprise at least a first section and a second section and as the gesture continues to be detected from the first section to the second section, the portable electronic device is arranged to display the identified selectable items.

The gesture may be a composite gesture comprising a plurality of actions, paths or a combination of actions and paths. There are many examples of composite gestures. For example, the first section of the gesture may comprise a single pointing gesture, for example, a single point of contact gesture also referred to as tap or press gesture, detected on the touch screen display 118. The single pointing gesture may be an off-screen pointing gesture, detected for example by a camera, or may be a 3D spatial gesture consisting of movement of the device itself, which may be detected by accelerometer or gyroscope 136. Mechanisms for detecting different types of gestures are described above. The second section may also comprise a single pointing gesture or may comprise a swipe, slide or drag action. With reference to FIG. 3, the gesture may be detected as a single tap at the start location 302, which becomes a swipe toward the left hand side of the display, to a left hand position 306.

Figure 4:
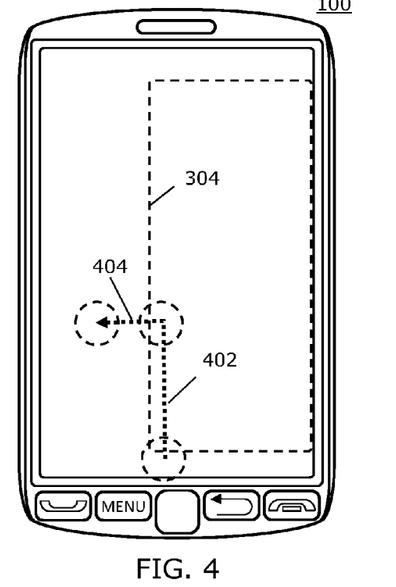

In another example, a gesture is initially detected at or near the bottom of the touch-sensitive display 118 and continues to be detected along the path of the arrow. As shown in FIG. 4, the path of the arrow has different directions; a first path 402 corresponding to the first section of the gesture is in an upward direction and a second path 404, corresponding to the second section of the gesture, in a direction from right to left.

A gesture having plurality of actions, paths or a combination of actions and paths may provide different functionality or actions of the device depending on the different sections 402, 404 of the gesture. In one example, detection of the first section 402 of the gesture may cause the device to "wake-up", at least partially from a low-power condition. When the device detects the second section 404 of the gesture, the device is arranged to select and display a category of selectable items, at a pre-defined area of the display, which in the examples of FIGS. 3 and 4 is the right hand side display area 304.

In some examples, detecting the gesture comprises detecting continuous movement from the first section to the second section. This continuous movement can be regarded as the continuation of a tap gesture into a swipe or slide gesture, as shown in FIG. 3, as well as the example shown in FIG. 4, where the gesture follows the path of the arrow and has different directions.

Detecting the gesture may, in some examples, comprise detecting a change in direction of the movement from the first section 402 to the second section 404. Detecting the change in direction, for example, may trigger the selection of the category of selectable items to be displayed.

Selecting the category determines where on the display the selectable items of the selected category will be displayed. For example, the right hand side display area 304 of FIGS. 3 and 4, may be for displaying notifications or a history of recent communications including new notifications and most recent viewed communications.

Figure 5:
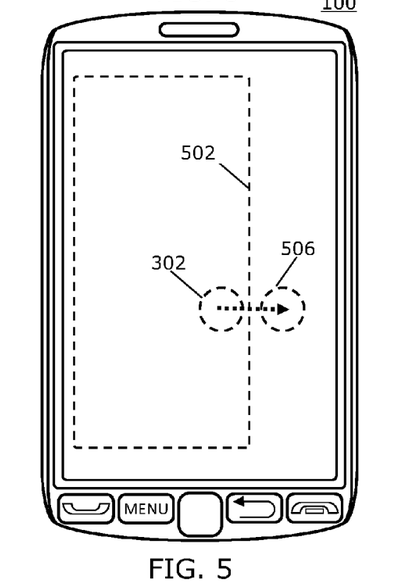
Figure 6:
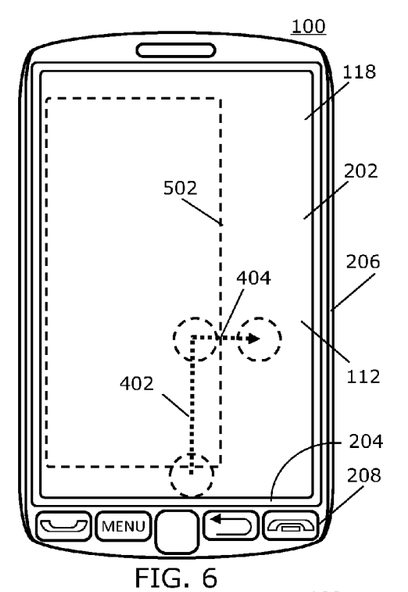

Another example of an area for displaying selectable items of another category, for example application icons, is shown in FIGS. 5 and 6. In these examples, the selectable items are displayed in a left hand side display area 502. FIG. 5 corresponds to the example of FIG. 3, and shows the gesture is detected as movement toward the right hand side 506 of the display, in the direction of the arrow. FIG. 6 corresponds to the example of FIG. 4, and shows the gesture initially detected at or near the bottom of the touch-sensitive display 118 and continues to be detected along the path of the arrow. As before, the path of the arrow has different directions; the first section 402 in an upward direction and the second section 404, which in this example is from right to left.

Figure 7:
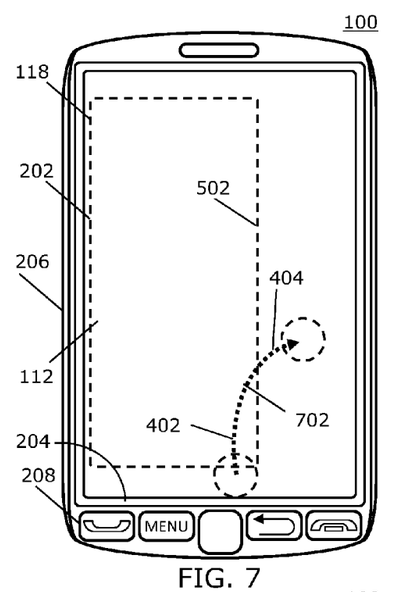

As described above, the gesture may be continuous from the first section 402 to the second section 404. In the examples of FIGS. 4 and 6, the gesture has two distinct paths or directions. In another example, the first and second sections 402, 404 of the gesture may have a common trajectory or path 702 as shown in FIG. 7.

There are a great number of possible gestures which could be employed within the various examples shown in the figures. Irrespective of the type of gesture or the gesture itself, the gesture is detected and translated such that it is possible to select a category based on the gesture.

Figure 8:
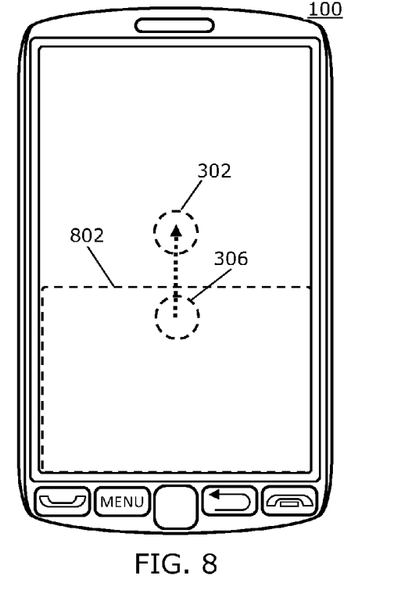
Figure 9:
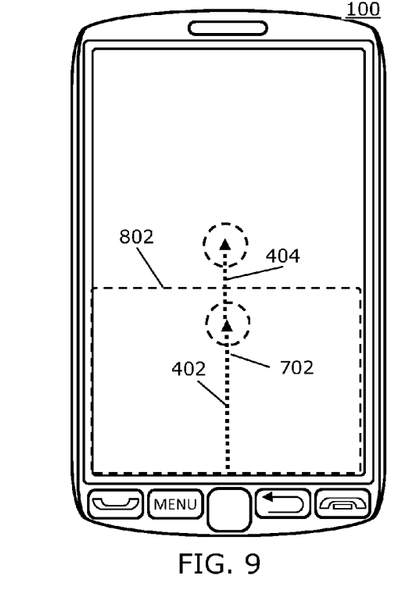

A bottom display area 802 for displaying another category of selectable items is shown in FIGS. 8 and 9. In some examples, the bottom display area 802 may be used for displaying widgets or widget information.

FIG. 8, corresponding to the examples of FIGS. 3, and 5, illustrates the gesture is detected as movement upward, toward the top of the display, in the direction of the arrow. FIG. 9 corresponding to the examples of FIGS. 4 and 6, illustrates the gesture detected initially at or near the bottom of the touch-sensitive display 118 and continues to be detected along the path of the arrow. The first and second sections 402, 404 of the gesture of this example also have a common trajectory or path 702.

As described above there are a plurality of categories of selectable items. These may include for example notifications, communications, application icons, widgets, and so forth. In some examples, categories may be combined to provide a yet further category.

Figure 10:
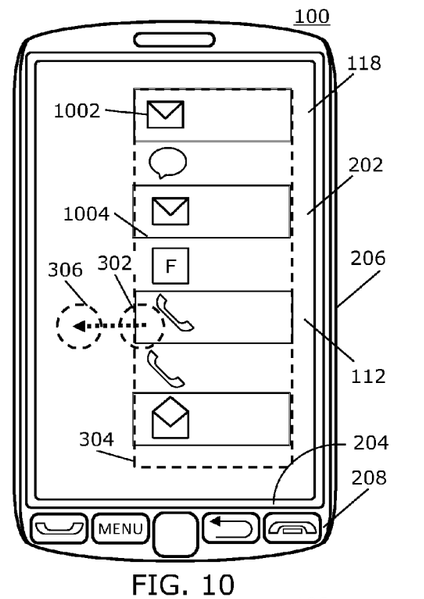

In an example, the category of selectable items may be notifications of application information. Notifications include, for example, notice of a received email, notice of a text message, notice of a missed phone call, a calendar event, a social networking notice, device condition, and so forth. Notifications may also relate to device conditions and include, for example, time of day, date, battery level, network signal strength indication, error condition, software problem, and so forth. In some examples, a selectable informational icon such as an envelope for email, a balloon for a text message, a phone for a missed call, an open envelope for a meeting invitation, and so forth, for each notification is identified and displayed within a pre-determined display area associated with this category, for example the right hand display area 304, as shown in FIG. 10. The selectable informational icon 1002 may be the selectable item, or the selectable informational icon 1002 may be displayed in relation to a selectable area 1004 depicting the selectable item. As shown in FIG. 10, a solid line box depicts a selectable area 1004 and as such a selectable item.

Figure 11:
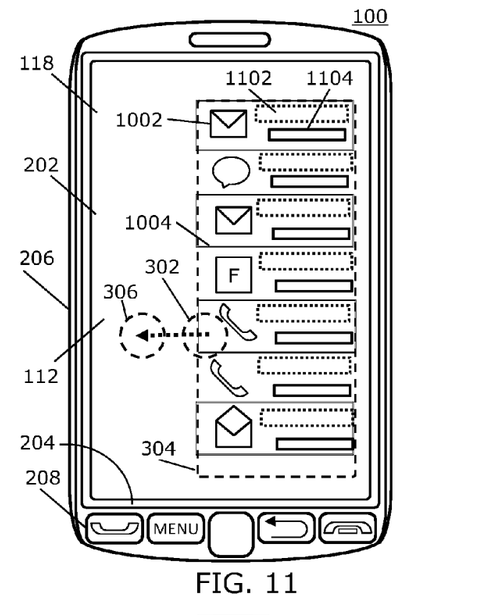

Notifications may be displayed with additional information, as shown in FIG. 11. The user is provided with the ability to preview information from a plurality of different applications without having to open the different applications and to optionally open one or more of the applications, if desired, through selection of an appropriate selectable item. The additional information may, for example, comprise: the name of a sender of a received communication; a preview summary of message content of a received communication; and contact details, for example a telephone number, relating to a received communication. In the example of FIG. 11, the name of a sender of a received communication is depicted by short-dashed rectangle 1102, and the preview summary or contact details is depicted by a heavy solid-dashed rectangle 1104. Varying amounts of additional information can be displayed depending on the size of the dedicated display areas 304, 502, 802, 1004, 1102 and 1104.

In an example, the category of selectable items may be communications from one or more applications. In this sense the display area 112 may be regarded as a preview window into an application interface or into an amalgamated interface for a plurality of applications. In this example, the right hand display area 304 is for displaying notifications of application information, and all the notifications may relate to different types of communications, for example e-mail, phone, messaging applications, and so forth. This category may be referred to simply as the "communications category". In this category, the selectable information icons are providing notifications regarding the plurality of communication types.

Characteristics of the selectable information icons may be altered depending on whether it has been determined that an incoming communication has previously been notified to the user, has been read, or remains unread. For example, selectable information icon 1108 of FIG. 11 indicates a communication which has been opened prior to the present peek view.

In some examples, additional information regarding notifications, communications, or a combination of both notifications and communications may be withheld from display during the preview or peek views. This advantageously maintains the privacy or secrecy of certain information. In some examples, the notifications or communications are categorized into one of two or more privacy categories, such that the amount of additional information displayed in connection with the notifications or communications is varied depending on the identified privacy category.

Each of the two or more categories may, for example, be selected to be one of a secure category and a non-secure category. Categorization in this regard may be based on a determined origin of a communication or account to which the communication belongs. For example, all e-mails to a work e-mail account may be regarded as belonging to the secure category. In addition, any communication from a particular source, e.g. an e-mail address or person, may also be regarded as belonging to the secure category.

Figure 12:
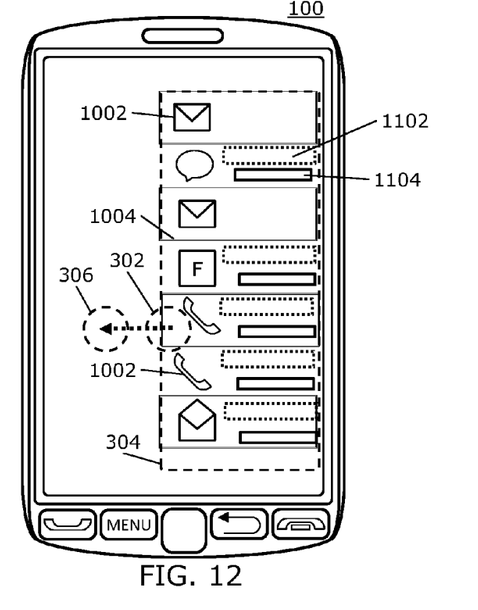

In some examples, the device is arranged to display one or more of sender details and content details for each notification or communication which is identified as belonging to a non-secure category, and not to a secure category. As shown in FIG. 12, certain notifications or communications are represented by selectable information icon 1002 and without any additional information, 1102, 1104. This maintains the privacy of certain information, while allowing the preview of other non-secure content and information.

Figure 13:
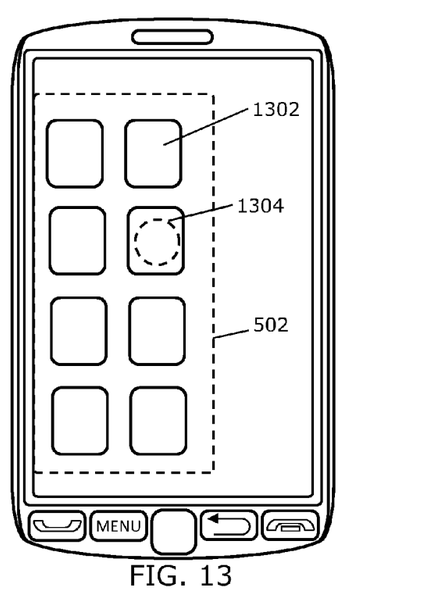

FIG. 13 shows an example layout for selectable items which are application icons displayed within a left-hand display area 304. The application icons are shown in a grid formation of two columns of four rows each. Any suitable configuration may be employed for the purpose of providing a user with a mechanism for quick selection from a subset of applications without requiring navigation through different levels and interfaces to select an application of interest.

As described above, the selectable items, which in this example are application icons 1302, are identified for display. In an example, the identification comprises selecting a subset of application icons based on one or more selection criteria. The selection criteria may comprise, for example, most recently used, most popular, most recently added, user-defined favorites, and so forth.

The application icons 1302 are selectable, for example, by tapping or pressing on a selected application icon, as shown by dashed circle 1304 in FIG. 13. In response to selection of an application icon 1302, a user interface associated with the selected application icon is activated. The current user interface may or may not be replaced with the user interface of the selected application. If selection of an application icon is not desired, a selection of a back button or interaction with the display area outside of the left-hand display area 502 may be employed to return the device to a previous user interface and operational condition, for example the low-power condition.

Figure 14:
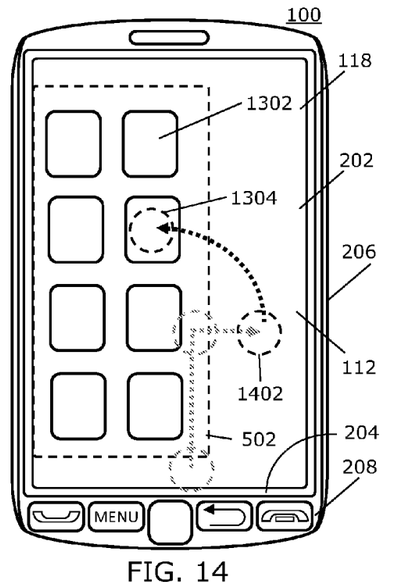

In some examples, selection of a selectable item, for example, an application icon may be achieved through detection that the gesture continues to be detected at an area of the display associated with a selected application icon. Referring to FIG. 14, and as described above with respect to FIG. 6, a gesture is detected and follows the path of an arrow to an intermediary position 1402. The gesture continues to be detected as it follows the arrow to stop or hover on an application icon, becoming the selected application icon, represented again by dashed circle 1304. Selection of an application icon in this manner causes the user interface associated with the selected application icon to be launched or activated.

The portable electronic device may be configured to transition to a locked condition in response to user input or after a pre-determined period of time expires. It is cumbersome for a user to have to unlock a device when they wish to check or review notifications or incoming communications. In addition, there may be some applications for which the locked condition need not apply. For example, for an application which does not give access to secure content on the device it may be desirable to by-pass an unlock screen or option in order to preview associated information. Examples include use of a calculator or access to a clock application having timer and alarm functionality. Selection of such application icons within the left-hand display area 502, may not invoke the unlock screen or option. However, use of the device may be limited to only those applications which are non-secure. If a user tries to access secure content of the device, an unlock operation will be required.

Figure 15:
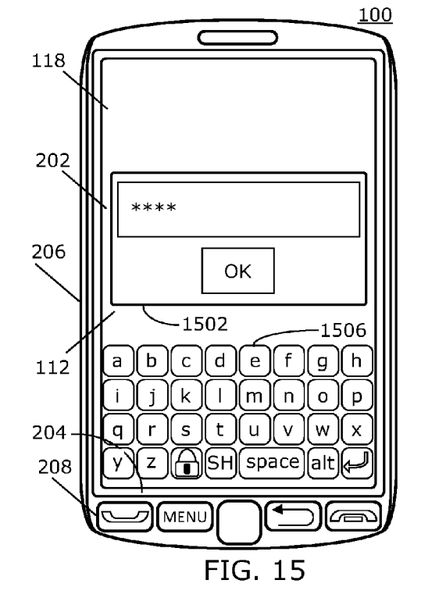

Applications which requires the portable electronic device to be unlocked, may still be selected through the peek view described above in relation to FIGS. 13 and 14. In some examples, before the device can transition to the selected application, an unlock option 1502 is presented to the user, as shown in FIG. 15. The unlock option 1502 is displayed in a window along with a keyboard 1506 to facilitate entry of a password. Successful authentication of the user causes subsequent transition to the user interface associated with the selected application icon.

As described above, the selected category of selectable items may comprise notifications, communications, and application icons. In addition, the selected category may include widgets. Widgets may be components, applications, or elements that often perform simple or limited functions, including displaying information, retrieving information, and so forth. When the selected category of selectable items is widgets, a widget interface is provided for displaying additional information.

Figure 16:
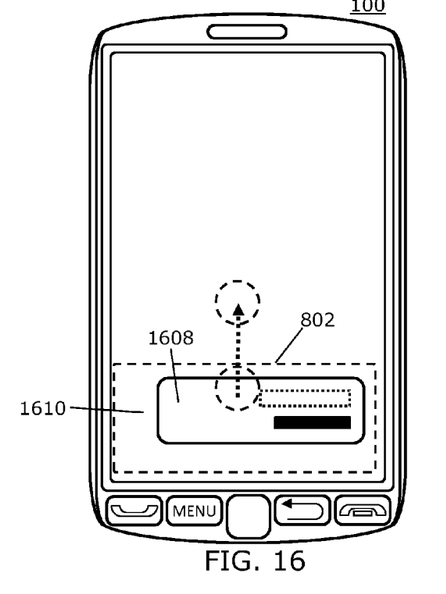
Figure 17:
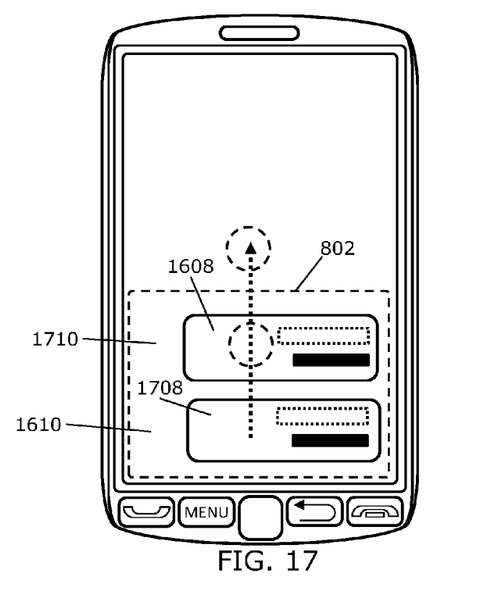

An example widget interface is described with respect to FIGS. 16 and 17. The selectable items, in this case one or more widgets 1302, are identified for display. In one example, the widgets are identified based on, for example, user preferences, a pre-determined list stored on or off the device, or on retrieval of instructions from a server.

Examples of widgets include news summaries, weather overviews, latest stock prices, calendar information, and so forth. A widget can be any suitable application for providing useful information or functionality to a user. Often widgets offer up-to-date information in real-time while the widget is being displayed on the display.

In an example, on detection of a gesture, as described with reference to FIGS. 8 and 9, one or more identified widgets are displayed in the bottom display area 802. In the example of FIG. 17, the widgets are shown in a list formation of one column of two rows. The widgets may be displayed in any other suitable configuration, for example, two columns by two rows.

The widgets may be updated in the background regardless of whether the device is in a low power condition or locked. In response to the necessary gesture, the widgets are displayed with the latest information, and because they have been updated on a continuous basis, irrespective of device condition, up-to-date information is displayed faster than the case where the device needs to be unlocked or "woken up", because in those cases there would be a delay while the widgets retrieved the latest information. The examples shown in FIGS. 16 and 17 allow a peek or preview of the widgets, regardless of device condition, in near-real-time.

In some examples, the amount of information, number of icons or widgets displayed may optionally be proportional to the length of the path of the gesture or the length of a part of the path of the gesture. More selectable items or widgets may optionally be displayed the longer the gesture is maintained or detected by the touch-sensitive display. Thus, the amount of information displayed may optionally be proportional to the duration or length of time of detection of the gesture.

In response to detection of the appropriate gesture, a first widget 1608 is displayed in the bottom display area 802, as shown in FIG. 16. As the gesture continues upwards, as shown in FIG. 17, the first widget 1608 and a second widget 1708 are displayed.

In further examples, the information of an identified widget may be displayed in accordance with user preferences or priorities. For example, if the identified widget is for displaying a current time and weather conditions for a plurality of different cities, the user may stipulate the order in which they are displayed (for example top to bottom or left to right). In the examples where the amount of information displayed varies depending on the length or duration of the gesture, this ensures that the user sees the most important information first.

For the examples described above, the display of the selectable items of a selected category may be animated, whereby one or more parameters of the animation are based on the detected gesture. In examples, the animation is aligned with the detected direction of the gesture. For example, where the gesture is a swipe upward, optionally the selectable items may be animated as appearing from the bottom of the screen and moving upward. With reference to FIGS. 16 and 17, the first widget 1608 may first appear at a bottom portion 1610 of the display, and as the gesture continues, the first widget may slide up to be displayed at a mid portion 1710 of the display, allowing for the second widget 1708 to be displayed in the bottom portion 1610.

In the examples above, variations on how the selectable items are displayed have been described in relation to a specific category. Varying the display of information depending on a privacy category has described in relation to the communication category. Selecting selectable items and presentation of the unlock option 1502 has been described with reference to the application icon category, and progressively displaying more information, and animating the display of the selectable items is described with reference to the widget category. However, all of these variations in the display of the selectable items apply equally to each of the other categories. For example, progressively showing more information of the communication category, for example, by animating the right hand display area 304 to slide in form the right hand side of the display as the gesture is detected as moving toward the left hand side of the display, may be particularly useful because it may not be necessary to display the full display for the user to gather the information they desire. For example, the user may simply view the selectable information icons 1002 to determine whether they wish to continue with the peek or preview. Alternatively, the user may be able to tell quickly, part way through the gesture or animation, who the sender of a communication is and whether they wish to proceed with the gesture to see the full display.

While a plurality of different gestures have been described to invoke different categories of selectable items for display, some examples may be based on a single gesture to cause a peek or preview of select additional informational or selectable items. For example, a single swipe gesture from a low power or locked condition may invoke a peek or preview screen in which additional information such as notifications, communications, widgets, or a combination of all types are displayed. Generally, any type of gesture with any suitable characteristics or path may be utilized, and the gestures described herein are simply examples.

The portable electronic device may return to the low power condition when the gesture is discontinued or reverses to the start position of the gesture. In some examples, no information is displayed on the display during the low-power condition. Allowing a partial display of a category of selectable items, for example, communications, and allowing the device to return to a previous condition is advantageous for minimizing the resources required to provide the display.

Figure 18:
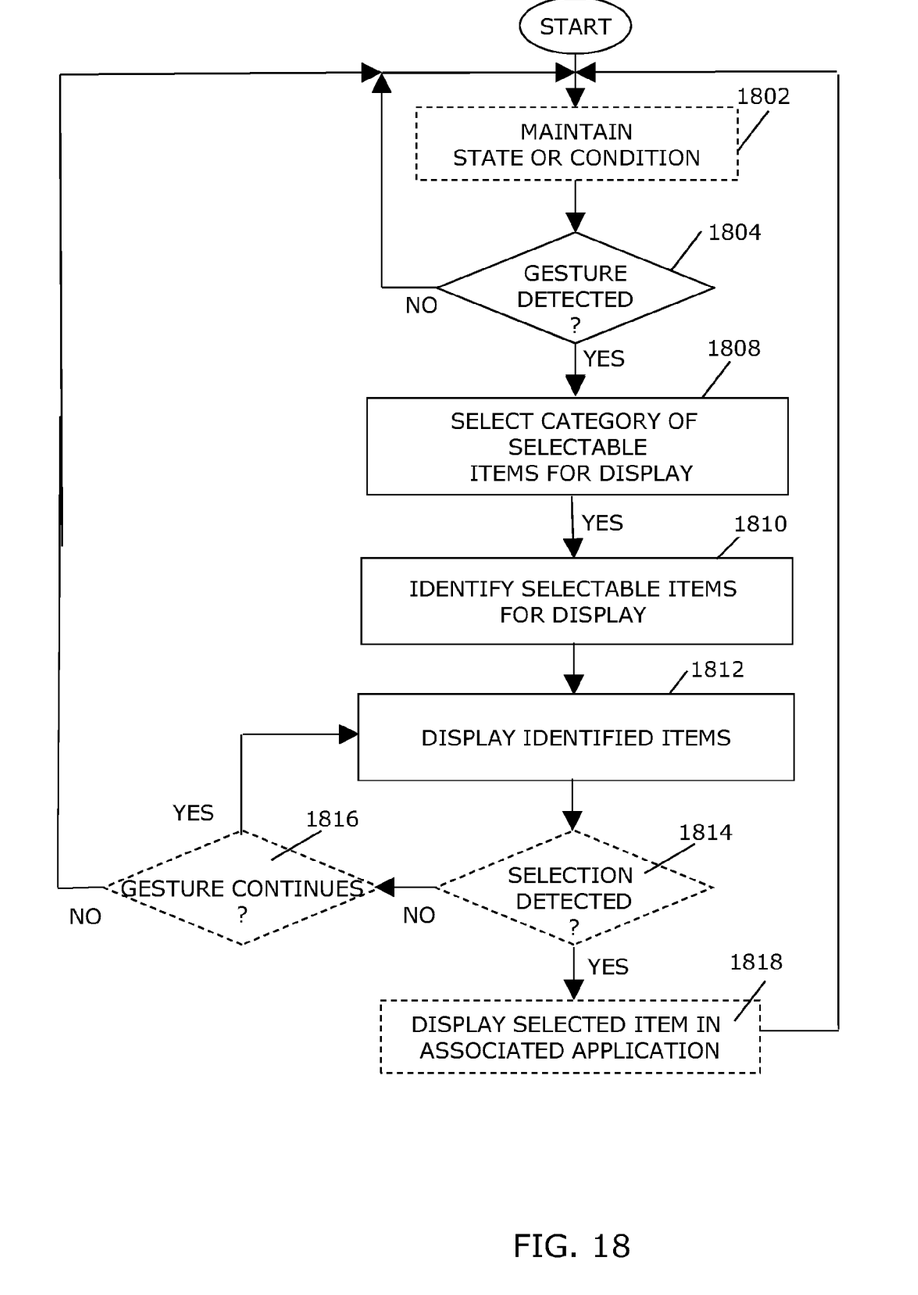
FIG. 18 is a flowchart illustrating a method of controlling a touch-sensitive display in accordance with the disclosure.

A flowchart illustrating a method of controlling a display such as a touch-sensitive display is shown in FIG. 18. The method may be carried out by software executed, for example, by the processor 102 of the electronic device, which may be a portable electronic device 100. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

The portable electronic device may be maintained 1802 in a low-power condition or a locked condition. In the low-power condition, for example, no information is displayed on the display 112 of the touch-sensitive display 118, e.g., the display 112 is blank or black with no pixels illuminated. In the locked condition, for example, access or use of the portable electronic device is limited and optionally an unlock option 1502 is displayed thereby facilitating the entry of authentication credentials. The processing activities of the device 100 are typically significantly reduced during a low-power condition. Minimal touch sensing is active on the touch-sensitive display 118, such that power usage is minimal. For example, scanning of touch sensors may take place every 100 to 500 ms or at a reduced rate from active touch sensing when in low-power condition. While the display 112/touch-sensitive display 118 is in the low-power condition or the locked condition, a gesture is detected 1804 on the touch-sensitive display 118, which at least minimally wakes-up the device and provides a peek or preview as described herein. There are many suitable gestures which can be employed for this purpose, many examples have been described above.

Based on the gesture detected on the touch-sensitive display, a category of selectable items is selected 1808. For example, a detected direction of movement of at least part of the gesture determines which category of selectable items is to be displayed. The direction of movement may also be used to determine where on the display the selectable items are to be displayed.

Selectable items are identified 1810 for display. Different criteria may be used for identifying selectable items in each category. For example, the communications category may base the identification on the most recent communications or notifications received. The identification 1810 of selectable items within the applications category may be based on criteria such as recently used, most popular, recently added, and user-defined favourite applications. A history of usage of applications may be recorded for the purpose of determining the recently used and most popular applications. In addition, metadata associated with an application may be used to determine when an application was added and as such can determine out of a plurality of applications, which were more recently added. A suitable user interface may be provided to record user preferences in relation to favourite applications, and may also record a preferred order of applications icons for display.

When identified, the selectable items are displayed 1812 on the touch-sensitive display 118. The selectable items may or may not be displayed in a pre-determined area of the touch-sensitive display 118. If pre-determined, the area in which the identified selectable items are displayed may be determined by the selected category. For example, selectable items from the communications category may be displayed in a right hand side display area 1904. Other examples are described above.

In some examples, the selectable items may be selected directly from the peek or preview described above. If selection of a selectable item is detected 1814, the selected item is displayed 1818 in an associated application interface. The selectable item may be selected as a touch contact on or near the location where the selectable item is displayed. The touch contact on or near the location where the selectable item is displayed may include a continuation of the gesture used to select the category of selectable items to be displayed. If selection is not detected, but the gesture continues to be detected 1816, the selectable items continue to be displayed 1812. Display of the selectable items may be animated as discussed above. Animation of the display may continue until the gesture ceases to be detected or until a limit of the animation has been reached. A limit of the animation may include, for example, a distance for the animated display to travel across the touch-sensitive display, or a time for the animated display to continue.

In addition to displaying categories of selectable items based on a detected gesture, the gesture may also be used to progressively illuminate the display while displaying informational icons. This may be particularly useful when the device is in a low-power condition when the gesture is detected, as the progressive illumination can be considered as providing a progressive and gradual "wake-up" from the low-power condition. The gesture for the progressive illumination of the display and the gesture for identifying and displaying a peek or preview of selectable items may be combined as a composite gesture, such that from a low power condition, the display may be progressively illuminated and then display the peek or preview of the selectable items.

Figure 19:
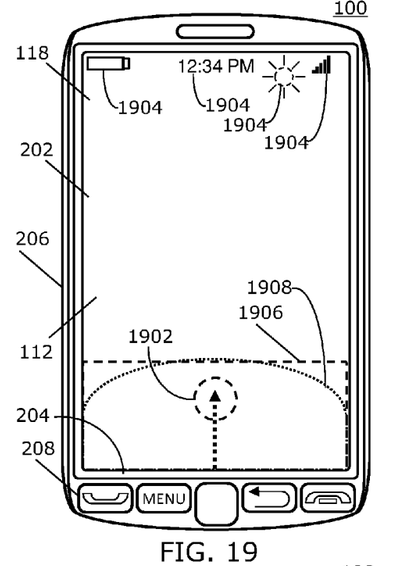
Figure 20:
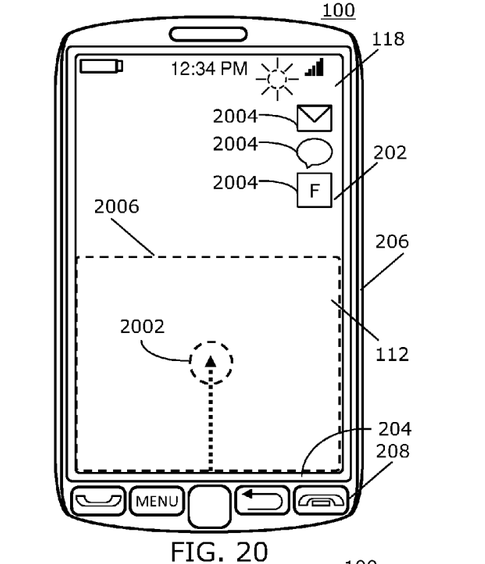
Figure 21:
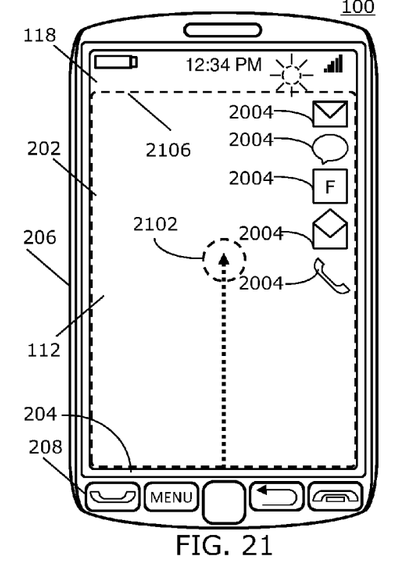

An example of progressively illuminating a display while displaying informational icons is shown in FIG. 19 through FIG. 21. In this portrait orientation example, a gesture is initially detected at or near the bottom of the touch-sensitive display 118 and continues to be detected along the path of the arrow. When the gesture is detected at the location 1902 in FIG. 19, a small area 1906 at the bottom of the display 118 is illuminated, and informational icons 1904 related to device condition are displayed. The shape of the illuminated area may be a shape other than rectangular, such as the alternative curved area 1908 that is similar to or simulates a glow of a sunrise.

The gesture continues to be detected as the gesture moves upward, as shown in FIG. 20. When the gesture is detected at the location 2002 in FIG. 20, a larger area 2006 at the bottom of the display 118 is illuminated, which area 2006 is larger than the area 1906, and informational icons 1904 related to device condition are displayed in addition to informational icons 2004 related to applications, such as email, text messaging, social networking, calendar, telephone, and so forth.

The gesture continues to be detected as the gesture continues to move upward, as shown in FIG. 21. When the gesture is detected at the location 2102 in FIG. 21, a larger area 2106 at the bottom of the display 118 is illuminated, which area 2106 is larger than the area 2006, and informational icons 1904 related to device condition are displayed in addition to informational icons 2004 related to applications. More informational icons 2004 related to applications are displayed in FIG. 21 than in FIG. 20, illustrating that more informational icons are displayed as the gesture continues to be detected.

If at any point between location 1902 and location 2102 the gesture changes direction, for example, by sliding to the right or left, the portable electronic device may be arranged to display identified selectable items as described above. In this regard, the upward swipe gesture of FIGS. 19 through 21 may be regarded as being the first section 404 of the gestures described FIGS. 4, 6 and 9. This combination of display techniques may be regarded as being a "wake and peek". As described above, this change in direction may be the trigger for selecting the category of selectable items to be identified and displayed.

Figure 22:
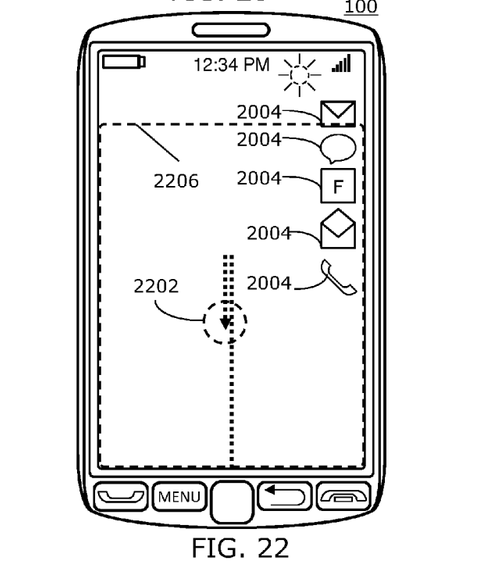

If the gesture does not change direction to the left or right, or if no selection of the selectable items is made, the gesture may continue to be detected as the gesture reverses direction and continues downward to the location 2202 shown in FIG. 22. The display 118 is progressively dimmed in this example as long as the direction of the gesture continues in the reverse direction. Fewer informational icons 2004 are displayed in FIG. 22 than in FIG. 21, and the area of illumination 2206 is smaller in FIG. 22 than in FIG. 21.

Alternatively, the gesture may continue upward from the bottom of the display until the gesture is detected to have a distance greater than or equal to a predetermined distance or length. The unlock option 1502 is displayed in a window along with a keyboard 1506 to facilitate entry of a password.

Figure 23:
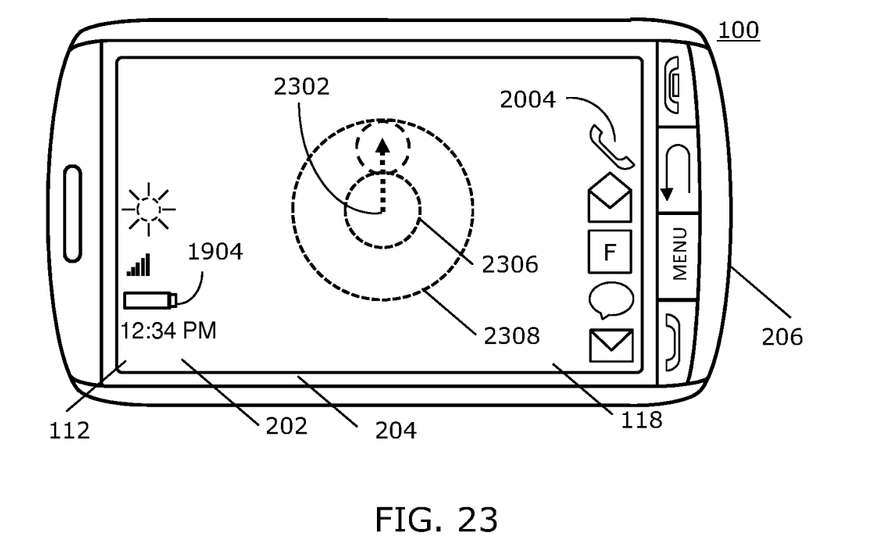

An alternative option is shown in FIG. 23, in which the illuminated area of the display 118 increases from a point, e.g., an origin 2302 of the gesture or the center of the display. As the gesture continues to be detected, the illuminated area increases in diameter, for example the smaller area 1406 occurs earlier in the gesture than the area 1408. The informational icons 1904, 2004 may be displayed all at once or increasing in number as the gesture continues to be detected.

The progressive illumination of the display in this example, may be combined with the functionality of selecting a category of selectable items to be identified and displayed. In this regard, the swipe gesture of FIG. 23 may be regarded as being the swipe gestures described in FIGS. 3, 5 and 8.

The above examples illustrate an upward and/or downward gesture beginning at the bottom of the display as the device is oriented. Optionally, different gestures or gestures associates with different edges or sides or corners may be utilized, including static or non-moving gestures. The user may be provided with the option to select the type of gesture, location of gesture, and/or origin of gesture.

When utilizing a touch-sensitive display 118 to detect a gesture, the gesture may comprise a series of taps on the touch-sensitive display 118. The detection of successive taps is detection of continuation of the gesture. A threshold time period may be applied to the detection of the sequence of taps. This series of taps may facilitate the gradual nature of modifying the visual display of touch-sensitive screen illumination and the selectable items to be identified and displayed. For example, a first tap may result in activating the display 112 at a first brightness level. A second tap may result in activating the display 112 at a second brightness level, and a third tap may result in activating the display 112 at a third brightness level. The third brightness level may be comparable to the normal brightness level when the device is in full active mode. Additional taps at different locations may determine which category of selectable items to be displayed. For example, a tap in a top right hand corner may result in displaying communications category, a tap in the top left hand corner may result in displaying the application icons, and a tap at the bottom of the screen may result in the widgets category being displayed. The number of taps may be applied to the brightness level of the display, the quantity of informational icons 1904, 2004 displayed, or both. The location of the taps may determine the category and positioning of selectable items to be displayed.

In another example utilizing a touch-sensitive display 118, the gesture may comprise a hovering touch, which may include simply detecting presence of a touch anywhere on the display 118. Differing periods of time may be correlated to different brightness levels. For example, a hovering touch exceeding a first duration may result in activating the display 112 at a first brightness level. The hovering touch continuing and exceeding a second duration may result in activating the display 112 at a second brightness level, and the hovering touch continuing and exceeding a third duration may result in activating the display 112 at a third brightness level. The third brightness level may be comparable to the normal brightness level when the device is in full active mode. The different durations may be entered by a user. The duration of the hovering touch may also be applied to the quantity of informational icons 1904, 2004 displayed. The duration of the hovering touch may be applied to the brightness level of the display, the quantity of informational icons 1904, 2004 displayed, or both. Detection of a direction of a hovering touch may determine the category and positioning of selectable items to be displayed.

Alternatively, the brightness levels may vary linearly as a function of the duration of the long press up to the level of the normal brightness level when the device is in full active mode. This gradual effect from a black screen until the gesture is no longer detected or normal brightness level is reached.

In another example, one or more infrared sensors may be utilized to detect a simplistic but specific gesture. For example, one or more infrared sensors may detect a hand waving across the display at a predetermined distance, in a particular direction.

The gesture may be a combination of gesture types or a compound gesture. For example, the gesture may initially comprise a 3D spatial gesture or voice command that triggers initial wakening of the device 100 followed by a touch detected by the touch-sensitive display 118 as the continuation of the gesture, which causes gradual or progressive change in display of the informational icons 1904, 2004, gradual or progressive change in the brightness of the display, or both. Detection of a direction of the continuation of the gesture may determine the category and positioning of selectable items to be displayed.

The illuminated areas 1906, 2006, 2106, 2206, 906, 1006, 1106, and 1206 in need not be rectangles, and may be any suitable shape, for example, semi-circular, circular, elliptical, or other shape including complex shapes.

Optionally, contrast levels of the image being displayed may be varied in order to achieve the same or similar result as progressively varying the brightness of the display.

Although categories of selectable items are shown displayed in particular locations in the examples described above, the selectable items may be displayed in any location on the display.

Although the method is advantageous for portable electronic devices due to the limited display size on a portable electronic device, such as a smartphone, the method may be applied to other electronic devices that have a larger display size.

The location of informational icons may be adjusted by the user. For example, the use may identify the quantity, order, or arrangement of selectable items or informational icons to be displayed.

A method comprises detecting, by a portable electronic device having a display, a gesture, selecting a category of selectable items based on the gesture. The method further comprises identifying one or more selectable items within the selected category to be displayed, and displaying the one or more selectable items. The portable electronic device may be operable in at least one of a low-power condition and a locked condition. The method may comprise detecting a direction of movement of the gesture. Optionally, the method may further comprise detecting a change in direction of the movement of the gesture; and triggering the selecting a category of selectable items.

Although the above examples illustrate various different features, the features of any example may be utilized with any other example unless the features conflict. For example, features of FIGS. 2 through 17 and 19 through 22 may be utilized in a landscape orientation, and features of FIG. 23 may be utilized in a portrait orientation. In addition, while the categories have been described as being displayed in particular locations on the display, the examples described are only one example arrangement. Other arrangements are envisaged. For example, the different categories could appear in any other suitable location on the display in response to the required gesture invoking that particular category. In other examples, the selectable items may be displayed in the same area of the display, but the category of selectable items being displayed depends on the gesture detected. Other features are interchangeable but are too numerous to identify briefly.

The terms left, right, top, bottom, and so forth are utilized herein for purpose of providing a perspective for reference but are not otherwise limiting.

Advantages of the method include providing the ability for the user to gain information from a device without requiring a full wake-up of the device or for a device in a locked condition to be unlocked. Previously, when a device was asleep or locked, if a user wanted more information about a notification or communication it was necessary to fully awaken and unlock the device. Also, if a user wanted to access certain applications for example those most frequently used, again it was necessary to fully awaken and unlock the device. Furthermore, if a user wanted to view up-to-date information from one or more widgets available on the device, it was necessary to fully awaken and unlock the device and it as also necessary to wait for the widgets to retrieve updated information after a "wake-up" or unlock operation.

In the above cases, awakening or unlocking the device may be disadvantageous in terms of power consumption and time to access the desired information. A user may wish to view many types of information, access content (such as communications) easily and quickly, as well as access applications in an efficient manner. However, often the user has to navigate through many menu options to achieve their desired purpose. This is time consuming and inefficient. By selecting a category of selectable items based on a gesture and identifying and displaying the selectable items the user may quickly and efficiently achieve their purpose.

In some situations, fully awakening a device or unlocking the device may be undesirable. For example, if a user receives a notification of a newly received communication, and the user only wishes to quickly check who the communication is from, it is necessary to go through a number of steps to access that information. Advantageously, this method provides a mechanism for quickly and intuitively accessing desired categories of content, applications and information.

Further problems occur if the user forgets to return the device to the previous condition, the device will expend more power than is necessary. Apart from being a waste of power, this problem is acute in portable electronic devices 100 where battery levels must be sufficient for a user to continue using the device. Minimizing wastage will help maximize the time between recharging the battery 142. In addition, if the user forgets to return their device to a locked condition, this can result in unintended action of the device such as "pocket dialing".

Advantageously, the reversible capability of this method ensures the device is returned to the previous condition to avoid or minimize the above problems. Either changing direction of the gesture, re-tracing or discontinuing the gesture may result in the device returning to the low power condition or the locked condition. This dimming is a particular benefit in relation to the power consumption of an OLED display, since a black OLED pixel consumes negligible power compared to a white OLED pixel. Therefore, by reducing the brightness levels and/or reducing the illuminated area of the display reduces power consumption.

Furthermore, physical keys used to unlock devices are normally placed on top, bottom, or along the sides of devices. When a user desires to utilize one hand to operate the device, pushing unlock buttons may require a shift in grip or inability to operate the device with one hand. Many of the examples do not require a user to shift grip to proceed with operating the device.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   detecting, by a portable electronic device having a display, a gesture;
   selecting, based on the gesture, a category of selectable items from a plurality of categories, each of the plurality of categories defined by a characteristic unique to the selectable items of each category;
   identifying, based on a selection criteria, one or more selectable items within the selected category to be displayed, wherein the selectable items within at least one of the selected category to be displayed include information associated with a communication received by the electronic device; and
   displaying the one or more selectable items.

2. The method of claim 1, wherein the portable electronic device is operable in at least one of a low-power condition and a locked condition.

3. The method of claim 1, wherein the gesture comprises at least one of a gesture detected by a touch-sensitive display and a 3D spatial gesture.

4. The method of claim 3, further comprising detecting a direction of movement of the gesture.

5. The method of claim 1, wherein the gesture comprises a first section and a second section and as the gesture progresses from the first section to the second section, the portable device is arranged to display the identified one or more selectable items.

6. The method of claim 5, wherein the first section of the gesture comprises a single pointing gesture.

7. The method of claim 5, wherein detecting the gesture comprises detecting continuous movement from the first section to the second section.

8. The method of claim 6, further comprising: detecting a change in direction of the movement of the gesture from the first section to the second section; and triggering the selecting a category of selectable items based on the detected change in direction.

9. The method of claim 1, further comprising detecting a direction of movement of the gesture, and wherein displaying the one or more selectable items comprises animating the one or more selectable items, wherein the animation is aligned with the detected direction of the gesture.

10. The method of claim 1, wherein the selected category of selectable items is selected from a group comprising notifications, communications, application icons, and widgets, and wherein the characteristic unique to the selectable items is unique to the selected category and the selectable items within the selected category.

11. The method of claim 10, wherein when the selected category is selected to be notifications, the method further comprises identifying at least one notification and an associated informational icon for each notification identified.

12. The method of claim 11, wherein the at least one notification comprises at least one of an email notification, a text message notification, and a calendar event.

13. The method of claim 11, wherein the at least one notification comprises a device condition of the portable electronic device.

14. The method of claim 11, further comprising categorizing the at least one notification into one of two or more privacy categories, and varying an amount of additional information displayed in connection with the at least one notification in dependence on the identified privacy category.

15. The method of claim 14, wherein each of the two or more privacy categories are selected to be one of a secure category and a non-secure category.

16. The method of claim 15, further comprising displaying one or more of sender details and content details for each notification identified as belonging to a non-secure category.

17. The method of claim 15, wherein when the portable electronic device is in a locked condition, the method further comprising displaying one or more of sender details and content details for each notification identified as belonging to a non-secure category.

18. The method of claim 1, wherein in response to selection of a selectable item, the method comprises displaying the selectable item in an associated application.

19. The method of claim 18, wherein selection of a selectable item comprises detecting continuation of the gesture to an area displaying the selected selectable item.

20. The method of claim 1, wherein when the portable electronic device is in a locked condition, and when a selectable item has been selected, displaying an unlock option, and subsequently displaying the selected item upon successful authentication via the unlock option.

21. The method of claim 2, further comprising returning the portable electronic device to the low power condition when the gesture is discontinued or reverses toward a starting position of the gesture.

22. The method of claim 2, wherein no information is displayed on the display during the low-power condition.

23. The method of claim 10, wherein when the selected category of selectable items comprises widgets, the method comprises displaying a widget interface for displaying additional information.

24. The method of claim 10, wherein when the selected category of selectable items include application icons, the method comprises selecting a subset of application icons based on one or more selection criteria selected from the group comprising: recently used, most popular, recently added, and user-defined favorites; and displaying the subset of application icons.

25. The method of claim 1, further comprising, when the portable electronic device is in a low-power condition and in response to detecting the first section of the gesture:
   identifying any informational icons to be displayed; and
   progressively illuminating the display while displaying the identified informational icons.

26. The method of claim 25, wherein progressively illuminating occurs while the gesture is detected.

27. An electronic device configured to perform the method of claim 1 and comprising a touch-sensitive display that detects the gesture.

28. A non-transitory computer-readable medium having computer-readable code executable by at least one processor of a portable electronic device to perform the method of claim 1.

29. The method of claim 1, wherein the gesture corresponds to the category of selectable items.

30. The method of claim 29, wherein the gesture is one of a plurality of gestures and wherein each of the plurality of gestures corresponds to one of a plurality of categories of selectable items.

31. The method of claim 5, further comprising unlocking or waking the device in response to detecting the first section of the gesture and displaying the category of the selectable items in response to detecting the second section of the gesture.

32. The method of claim 5, further comprising detecting a change in direction of the movement from the first section to the second section and displaying the category of selectable items upon detection of the change in direction.

33. The method of claim 1, wherein detecting the gesture comprises detecting the start location at any position on at least one of the display or a non-display area adjacent the display and proceeding along a path in one of a plurality of directions, wherein each category of selectable items from the plurality of categories is associated with a respective one of the plurality of directions.

34. The method of claim 33, further comprising detecting movement of the gesture in a first direction of the plurality of directions.

35. The method of claim 34, further comprising displaying a first category of selectable items from the plurality of categories in response to detecting the movement of the gesture in the first direction.

36. The method of claim 35, further comprising detecting the gesture in a second direction of the plurality of directions and displaying a second category of selectable items from the plurality of categories in response to detecting the movement of the gesture in the second direction.

37. The method of claim 1, wherein detecting the gesture comprises detecting a gesture having a start location not contingent on a predetermined start location.

38. The method of claim 1, wherein detecting the gesture comprises detecting a first instance of the gesture having a first start location and a second instance of the gesture having a second start location, the first instance being different than the second instance, and the first start location being at a position on at least one of the display or a non-display area adjacent the display that is different from a position of the second start location.

* * * * *